United States Patent [19]
Erbes et al.

[11] Patent Number: 5,905,771
[45] Date of Patent: *May 18, 1999

[54] REACTOR CORE SHROUD REPAIR USING SPLICE PLATE TO BRIDGE WELD SEAM

[75] Inventors: John Geddes Erbes, Mt. View; Grant Clark Jensen, Morgan Hill; James Edward Charnley, Nevada City, all of Calif.

[73] Assignee: General Electric Company, San Jose, Calif.

[ * ] Notice: This patent is subject to a terminal disclaimer.

[21] Appl. No.: 08/975,784

[22] Filed: Nov. 21, 1997

Related U.S. Application Data

[62] Division of application No. 08/823,355, Mar. 24, 1997, Pat. No. 5,803,686, which is a division of application No. 08/653,219, May 24, 1996, Pat. No. 5,675,619, which is a continuation-in-part of application No. 08/311,300, Sep. 23, 1994, Pat. No. 5,521,951.

[51] Int. Cl.$^6$ .................................................. G21C 19/00
[52] U.S. Cl. ........................................ 376/302; 29/402.15
[58] Field of Search ..................................... 376/260, 287, 376/302, 303, 304, 446; 29/402.08, 402.14, 402.15, 402.17, 723; 411/55, 57, 60, 61; 403/292, 297

[56] References Cited

U.S. PATENT DOCUMENTS

| 5,392,322 | 2/1995 | Whitling et al. | 376/302 |
| 5,521,951 | 5/1996 | Charnley et al. | 376/302 |
| 5,675,619 | 10/1997 | Erbes et al. | 376/303 |

*Primary Examiner*—Daniel D. Wasil
*Attorney, Agent, or Firm*—James E. McGinness; Dennis M. Flaherty

[57] ABSTRACT

An apparatus for repairing a shroud in which one or more seam welds are cracked. The repair involves the attachment of a splice bracket to the shroud so that the bracket bridges the cracked weld seam and is applicable to both vertical and horizontal weld seams. The bracket is intended to structurally replace the shroud seam weld which is cracked. Multiple splice brackets can be placed along the length of a crack. Each splice bracket is attached to the shroud by a plurality of tapered fastener assemblies. Each tapered fastener assembly includes a first fastener element having a threaded surface and a conical surface coaxial with the threaded surface; a slotted sleeve having an internal surface which matches the conical surface of the first fastener element and an external surface which matches a circular cylindrical surface, and a flange which extends radially outward beyond the external surface; and a second fastener element having a threaded surface threadably engaged with the threaded surface of the first fastener element. The sleeve fits inside aligned holes in the splice bracket and shroud.

18 Claims, 8 Drawing Sheets

REACTOR CORE SHROUD REPAIR USING SPLICE PLATE TO BRIDGE WELD SEAM

RELATED PATENT APPLICATION

This application is a divisional of U.S. patent application Ser. No. 08/823,355 filed on Mar. 24, 1997 and issued as U.S. Pat. No. 5,803,686 on Sep. 8, 1998, which is a divisional of U.S. patent application Ser. No. 08/653,219 filed on May 24, 1996 and issued as U.S. Pat. No. 5,675,619 on Oct. 7, 1997, which is a continuation-in-part application of U.S. patent application Ser. No. 08/311,300 filed on Sep. 23, 1994, and issued on May 28, 1996 as U.S. Pat. No. 5,521,951.

FIELD OF THE INVENTION

This invention relates to maintenance and repair of nuclear reactors. In particular, the invention relates to the repair of the fuel core shroud of a boiling water reactor.

BACKGROUND OF THE INVENTION

Figure 1:
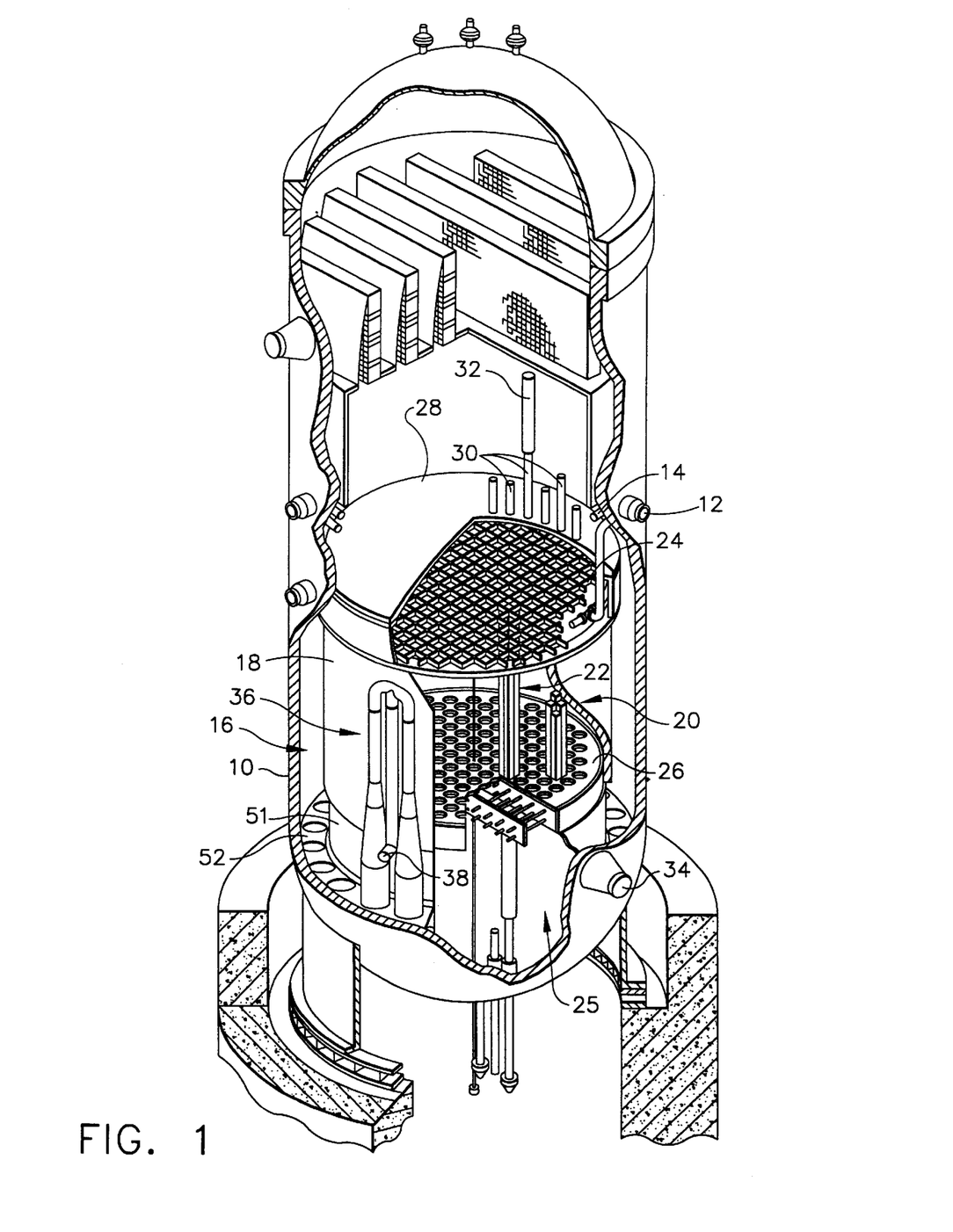
FIG. 1 is a schematic showing a partially cutaway perspective view of a conventional BWR.

A conventional boiling water reactor is shown in FIG. 1. Feedwater is admitted into a reactor pressure vessel (RPV) 10 via a feedwater inlet 12 and a feedwater sparger 14. The feedwater flows downwardly through the downcomer annulus 16, which is an annular region between RPV 10 and a core shroud 18. The core shroud 18 is a stainless steel cylinder which surrounds the nuclear fuel core 20, which is made up of a plurality of fuel bundle assemblies 22 (only two 2×2 arrays of which are shown in FIG. 1). Each array of fuel bundle assemblies is supported at the top by a top guide 24 and at the bottom by a core plate 26.

The water flows through downcomer annulus 16 to the core lower plenum 25. The water subsequently enters the fuel assemblies 22, wherein a boiling boundary layer is established. A mixture of water and steam enters the core upper plenum under the shroud head 28. The steam-water mixture flows through standpipes 30 and enters steam separators 32.

The BWR also includes a coolant recirculation system which provides the forced convection flow through the core necessary to attain the required power density. A portion of the water is sucked from the lower end of the downcomer annulus 16 via recirculation water outlet 34 and forced by a centrifugal recirculation pump (not shown) into jet pump assemblies 36 (only one of which is shown) via recirculation water inlets 38. The jet pump assemblies are circumferentially distributed around the core shroud 18.

Stress corrosion cracking (SCC) is a known phenomenon occurring in reactor components, such as structural members, piping, fasteners, and welds, exposed to high-temperature water. The reactor components are subject to a variety of stresses associated with, e.g., differences in thermal expansion, the operating pressure needed for the containment of the reactor cooling water, and other sources such as residual stress from welding, cold working and other inhomogeneous metal treatments. In addition, water chemistry, welding, heat treatment, and radiation can increase the susceptibility of metal in a component to SCC.

Stress corrosion cracking has been found in the shroud seam welds or heat affected zones of the core shroud 18. This diminishes the structural integrity of the shroud, which vertically and horizontally supports the core plate 26, the top guide 24 and the shroud head 28. Thus, there is a need for a method and an apparatus for repairing a shroud which has cracks in or near the shroud seam welds.

SUMMARY OF THE INVENTION

The present invention is an apparatus for repairing a shroud in which one or more shroud seam welds have experienced SCC. The repair involves the attachment of a splice bracket to the shroud so that the bracket bridges the cracked weld seam and is applicable to both vertical and horizontal weld seams. The splice bracket is held by a plurality of shear pins. The bracket is intended to structurally replace the shroud seam weld which is cracked. Multiple splice brackets can be placed along the length of a crack. Each cracked shroud seam weld can be repaired independently.

The shroud repair splice brackets in accordance with the invention are designed to withstand the thermal and structural loads and radiological conditions which the shroud is subjected to. Further, the shroud repair brackets of the present invention are designed and installed such that maintenance and inspection operations, such as removal of jet pump inlet mixers and RPV belt-line inspection, can be performed without removal of the repair brackets.

In the case of a cracked shroud girth seam weld, the splice bracket is designed to support adjoining parts of the shroud above and below the cracked weld area, replacing the structural function of the girth weld. The splice bracket is fastened to the shroud above and below the cracked shroud girth seam weld in a manner which will prevent relative movement across the cracked shroud girth seam weld. Similarly, in the case of a cracked vertical shroud seam weld, the splice bracket is designed to support adjoining parts of the shroud on opposing sides of the cracked weld area, replacing the structural function of the vertical weld. In both cases, the splice plate serves to limit the amount of fluid which flows through a crack from the relatively higher-pressure interior of the shroud to the relatively lower-pressure exterior of the shroud, i.e., the downcomer annulus.

In accordance with the preferred embodiments of the invention, the splice bracket has a plurality of circular holes for receiving a corresponding plurality of tapered fastener assemblies. A corresponding plurality of circular holes are machined in the shroud wall at positions which will be aligned with the holes in the splice bracket when the latter is correctly positioned adjacent the shroud. To facilitate machining alignments the holes in the shroud are preferably mutually parallel, as are the holes in the splice bracket. A respective tapered fastener assembly is installed in each set of aligned holes. The design provides for blind installation, i.e., with access from only one side. For example, some splice brackets can be installed on the outside of the shroud in areas where the jet pump assemblies pose no obstruction, while other splice brackets are installed on the inside of the shroud where access to the shroud exterior is blocked by the jet pump assemblies. The fastener assemblies are manipulated remotely to fasten the splice bracket to the shroud.

In accordance with one preferred embodiment of the invention, each tapered fastener assembly comprises a threaded and tapered shear pin, a split (i.e., slotted) sleeve with a tapered bore and a threaded nut. The shear pin has threads on one end and a precise conical taper on the shank. When fully installed, the shear pin is encased by the sleeve. The split sleeve has a longitudinal slot which allows the sleeve to be flexed radially outward into a configuration having an expanded diameter. In the unflexed state, the split sleeve has a precise internal taper which matches the external conical taper of the pin; an external surface having a diameter which is smaller than the inside diameter of the holes in the shroud and in the splice bracket (for assembly clearance); and a raised annular flange to act as an axial position stop. The annular flange is sized to just pass through the ho/les in the bracket and shroud when the sleeve is unflexed. A shear bolt is used instead of a nut to minimize protrusion of the installed assembly when available space is limited. The nut is tightened to pull the pin enough to expand the sleeve by an amount sufficient that the annular flange will not pass through the holes. Then the pin is additionally torqued or tensioned to produce the desired preload, during which the sleeve expands further to tightly fit the hole, thereby making a rigid shear fastener joint. Thereafter the nut is locked against rotation relative to the pin.

In accordance with another preferred embodiment of the invention, each tapered fastener assembly comprises a threaded and tapered shank, a split sleeve with a tapered bore, and a threaded shear bolt. The shank has a central threaded bore for receiving the threaded shank of the shear bolt and a precise conical taper on its outer circumferential surface. When fully installed, the tapered shank is encased by the sleeve. The sleeve has a longitudinal slot which allows the sleeve to be flexed radially outward into a configuration having an expanded diameter. In the unflexed state, the split sleeve has a precise internal taper which matches the external conical taper of the shank; an external surface having a radius of curvature which is smaller than the radius of curvature of the holes in the shroud and in the splice bracket; and a raised annular flange to act as an axial position stop. The annular flange is sized to just pass through the holes in the bracket and shroud when the sleeve is unflexed. The shear bolt is tightened to pull the shank enough to expand the sleeve by an amount sufficient that the annular flange will not pass through the holes. Then the shank is additionally torqued or tensioned to produce the desired preload, during which the sleeve expands further.

To eliminate the need for a lock weld, a lock washer can be provided between the tapered shank and the shear bolt to prevent detorquing of the bolt, e.g., due to vibrations during reactor operation. A first preferred embodiment of the lock washer comprises a spring having a locking tang at one end and a tooth at the other end. The tang fits in a circular axial hole in the head of the shear bolt. The lock washer tooth meshes with one of a series of ratchet teeth machined into the opposing end face of the tapered shank. The ratchet teeth are slanted to allow relative rotation of the bolt and the shank in the tightening direction, while providing a positive lock against relative rotation in the detorquing or loosening direction. In a second preferred embodiment of the lock washer, the tooth and tang project from the same end of the spring. In either embodiment, the projecting tang may be checked for tightness after installation to ensure the fastener has been properly locked. For the second embodiment only, the tang has a recess which can be grasped by a tool. The grasping tool can be manipulated remotely to pull the tooth out of engagement with the ratchet teeth on the tapered shank, thereby unlocking the shear bolt and allowing it to be detorqued without damaging the lock washer.

All steps in the installation of the shroud splice bracket assemblies in accordance with the invention are performed remotely with access from only one side of the shroud. In particular, the tapered fastener assemblies in accordance with the invention can be installed from outside or inside of the shroud. Prior to insertion, an unflexed split sleeve is slided onto a tapered fastener element having threads and then a threaded fastener element is threadably coupled to the threads of the tapered fastener element for a number of turns sufficient to hold the unflexed sleeve in place on the tapered fastener elements This yields a minimum flange diameter which is less than the diameter of the holes in the bracket and shroud wall, allowing the sleeve to pass through the holes. The assembly is then pushed through the aligned holes in the bracket and shroud wall. Once the raised flange of the sleeve clears the inner edge of the hole in the shroud wall, the threaded fastener element is tightened to pull the tapered fastener element back until the assembly is seated, i.e., the annular flange on the sleeve latches behind the shroud wall. During this operation, the sleeve is restrained axially initially by a thrust plate on the tool, reacting between the threaded fastener element and the sleeve, and then after some expansion, by the raised flange bearing against the inner circumferential surface of the shroud wall. Higher axial load is then applied by torquing or tensioning. This provides a tight fit which may also apply a contact pressure between the tapered fastener element, split sleeve, bracket and shroud. The magnitude of this contact pressure can be controlled by varying the torque or tension applied to the tapered fastener element, by varying the taper angle and by varying the surface conditions. Friction resulting from the contact pressure provides additional strength to the joint.

This shroud repair design is advantageous because it allows fast installation using the minimum number of fasteners to achieve maximum joint strength. All holes in the shroud are circular cylindrical so that machining the shroud holes is simplified. The splice brackets can be installed entirely from one side of the shroud. When the splice brackets are installed from the outside of the shroud, it is unnecessary to remove the top guide or the fuel bundle assemblies inside the shroud. Conversely, when the splice brackets are installed from the inside of the shroud, it is unnecessary to remove the jet pump assemblies outside the shroud. The number of splice brackets needed to accomplish the repair is reduced due to the high load capacity of the fastener elements and the splice brackets. Also the brackets in accordance with the invention occupy little space in the reactor, which minimizes the impact on other activities inside the reactor. The bracket size and number of fastening assemblies per bracket can be selected based on the space available and the design loads. The loads on the shroud include: (1) the pressure differential between the inside and outside of the shroud; (2) seismic loading; and (3) the deadweight of the shroud head, steam separators etc.

DETAILED DESCRIPTION OF THE PREFERRED EMBODIMENTS

Figure 2:
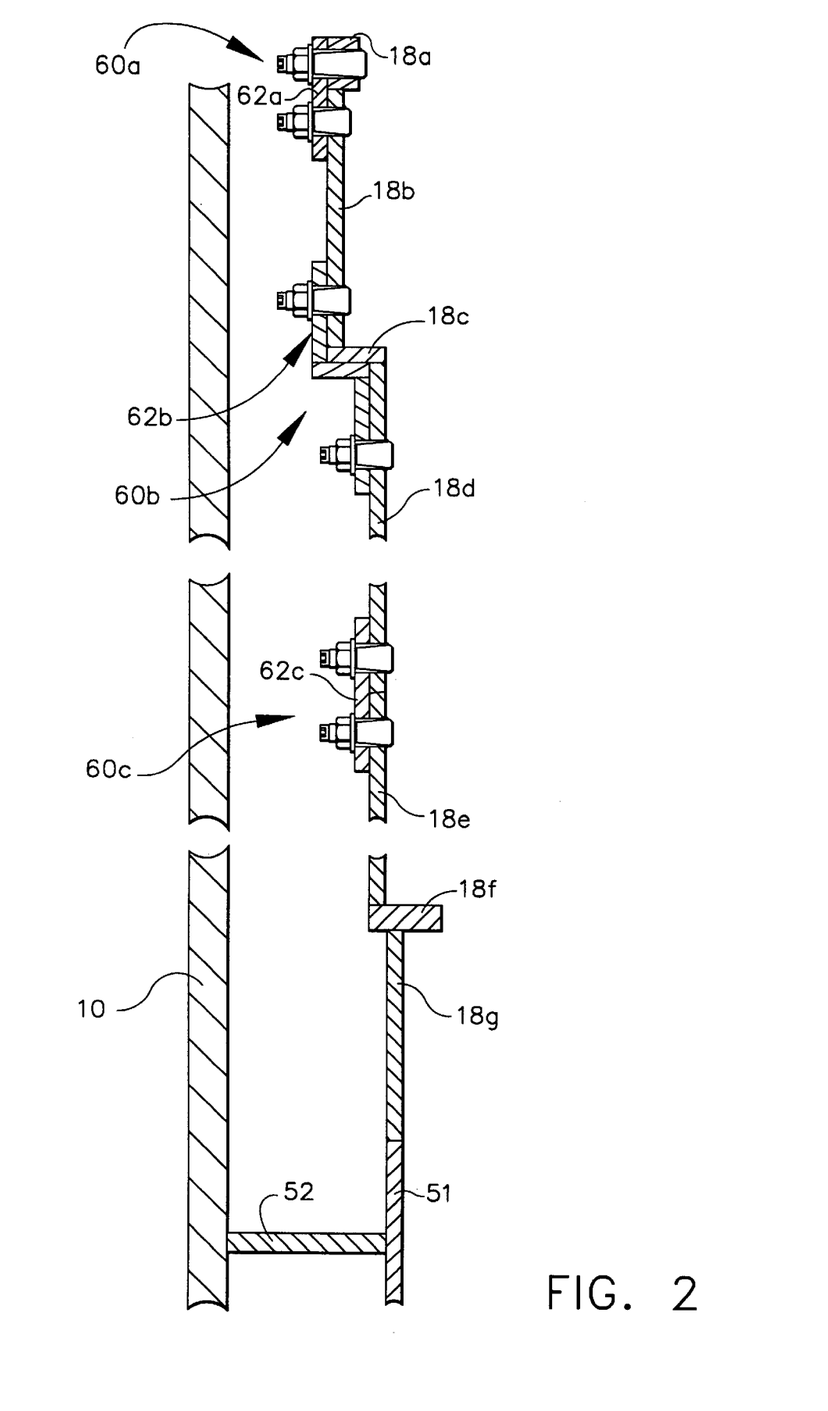
FIG. 2 is a schematic showing a sectional view of a portion of one type of BWR core shroud repair with installed girth seam weld splice bracket assemblies in accordance with a first preferred embodiment of the invention.

Referring to FIG. 2, one type of core shroud 18 comprises a shroud head flange 18a for supporting the shroud head 28; a circular cylindrical upper shell section 18b welded to shroud head flange 18a; an annular top guide support ring 18c welded to upper shell section 18b; circular cylindrical top and bottom mid-core shell sections 18d and 18e joined at core mid-plane weld 50, with top section 18d welded to top guide support ring 18c and bottom section 18e welded to an annular core plate support ring 18f; and a lower shell section 18g welded to the core plate support ring 18f. The top and bottom sections 18d and 18e of the mid-core shell section are of equal diameter. The diameter of upper shell section 18b is greater than the diameter of mid-core shell sections 18d and 18e, which is in turn greater than the diameter of lower shell section 18g. The entire shroud is supported by shroud support 51, which is welded to the bottom of lower shell section 18f, and by annular shroud support plate 52, which is welded at its inner diameter to shroud support 51 and at its outer diameter to RPV 10. All of the aforementioned welds extend around the entire circumference of the shroud and constitute the shroud girth seam welds.

Stress corrosion cracking has been found in the shroud girth seam welds or heat affected zones thereof. In accordance with the preferred embodiment of the present invention, a plurality of shroud splice bracket assemblies are arranged around the shroud circumference at the elevation of the stress corrosion cracking. The purpose of these bracket assemblies is to structurally replace the shroud girth seam welds which are potentially weakened by cracks. Brackets may be installed only at welds found to have cracking, or at all vertical weld seams to protect against future cracking.

Figure 3:
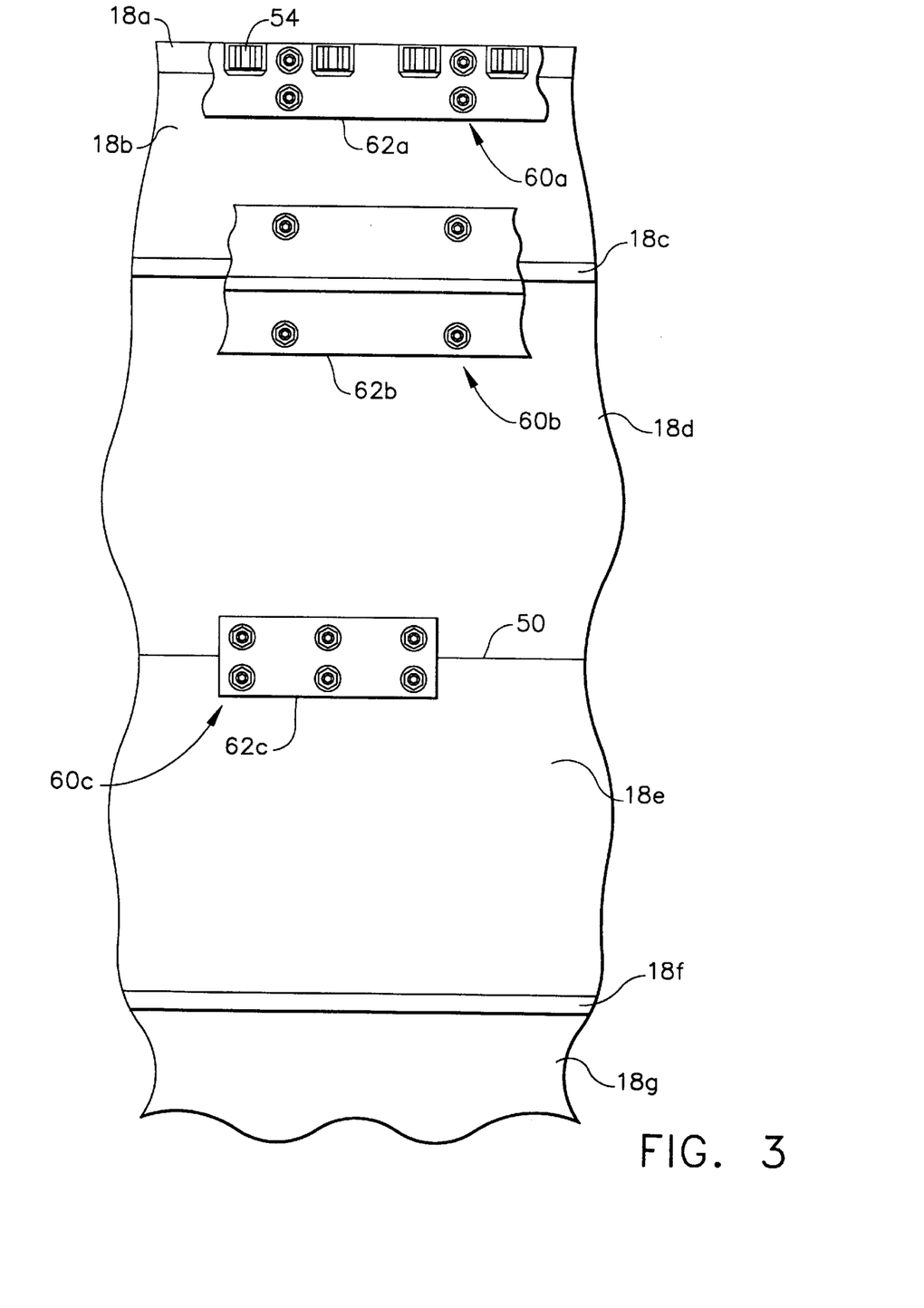
FIG. 3 is a schematic showing an azimuthal view of a portion of a core shroud having girth seam weld splice bracket assemblies installed at three different elevations.

Each splice bracket is fastened to the shroud above and below the crack elevation in a manner which will prevent relative movement across the shroud girth seam welds. As seen in FIGS. 2 and 3, in accordance with the repair technique of the present invention, a plurality of bracket assemblies 60a, 60b and 60c are installed at different elevations: one for reinforcing cracks in the welds joining shroud head flange 18a to upper shell section 18b; one for reinforcing cracks in the top guide support ring 18c; and one for reinforcing cracks in the core mid-plane weld 50.

Bracket assembly 60a has a bracket 62a for splicing shroud head flange 18a to upper shell section 18b when cracking occurs in the girth welds joining those sections. Preferably, bracket 62a is a curved plate having a radius of curvature approximately equal to the outer radius of upper shell section 18b. As seen in FIG. 3, bracket 62a is provided with a notch for each shroud head bolt lug 54 to be circumvented. Bracket 62a is fastened to upper shell section 18b by two tapered pins 66 and to shroud head flange 18a by two tapered pins 66', pins 66' being longer than pins 66.

Bracket assembly 60b has a bracket 62b for splicing upper shell section 18b to top section 18d of the mid-core shell section when the top guide support ring is cracked. Preferably, bracket 62b is a welded assembly of curved plates, the upper curved plate having a radius of curvature approximately equal to the outer radius of upper shell section 18b and the lower curved plate having a radius of curvature approximately equal to the outer radius of top section 18d of the mid-core shell section. Bracket 62b is fastened to upper shell section 18b and to top section 18d of the mid-core shell section by respective pairs of tapered pins 66.

Finally, bracket assembly 60c has a bracket 62c for splicing top section 18d to bottom section 18e of the mid-core shell section when the core mid-plane girth weld is cracked. Preferably, bracket 62c is a curved plate having a radius of curvature approximately equal to the outer radius of the mid-core shell section. The bracket 62c is fastened to top section 18d and to bottom section 18e of the mid-core shell section by respective sets of three tapered pins 66.

Figure 4:
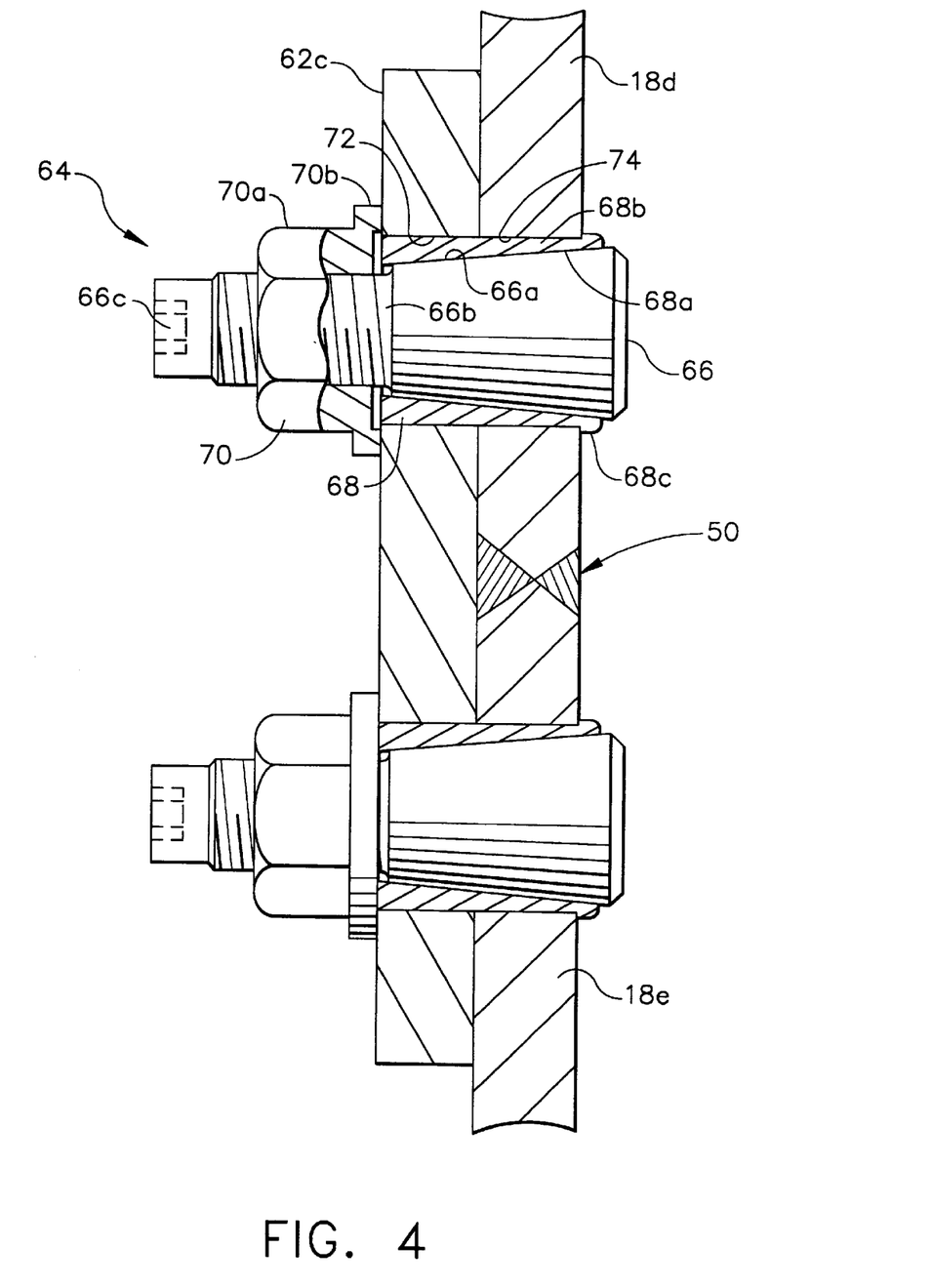
FIG. 4 is a schematic showing a sectional view of an installed girth seam weld splice bracket assembly in accordance with the first preferred embodiment of the invention.

In accordance with the preferred embodiment of the invention, each bracket is fastened to the shroud using tapered pin assemblies 64 which couple with aligned holes in the bracket and shroud. As seen in FIG. 4, the holes 72 in the bracket and holes 74 in the shroud wall are circular cylindrical and of equal diameter. Holes 74 are remotely machined in the shroud wall by a conventional electric discharge or other suitable machining technique. Preferably the holes in the shroud are mutually parallel, as are the holes in the splice bracket. The brackets may be provided with raised bearing pads (not shown in FIG. 4) which extend around the periphery of holes 72. These pads allow local machining to precisely match the contact surface of the bracket to the curved external surface of the shroud wall.

FIG. 4 shows bracket 62c fastened to the top and bottom sections 18d and 18e of the mid-core shell section by tapered pin assemblies 64 in accordance with the preferred embodiment of the invention. Each tapered pin assembly comprises a threaded tapered pin 66, a split sleeve 68 and a threaded nut 70. The tapered pin has threaded portion 66b and a socket 66c on one end and an external conical, i.e., tapered, surface 66a on the other end. Each tapered pin 66 is held inside the holes 72, 74 by split sleeve 68 and threaded nut 70.

When fully installed, the tapered portion of pin 66 is encased by split sleeve 68. The sleeve, shown in detail in FIG. 5, has a longitudinal slot 69 which allows the sleeve to be flexed radially outward into a configuration having an expanded diameter. The flexed sleeve 68 has an internal conical surface 68a which matches the external conical surface 66a of pin 66; an external surface 68b having a radius of curvature which matches the radius of curvature of hole 72 in the bracket and hole 74 in the shroud; and a raised flange 68c to act as an axial position stop.

Figure 5:
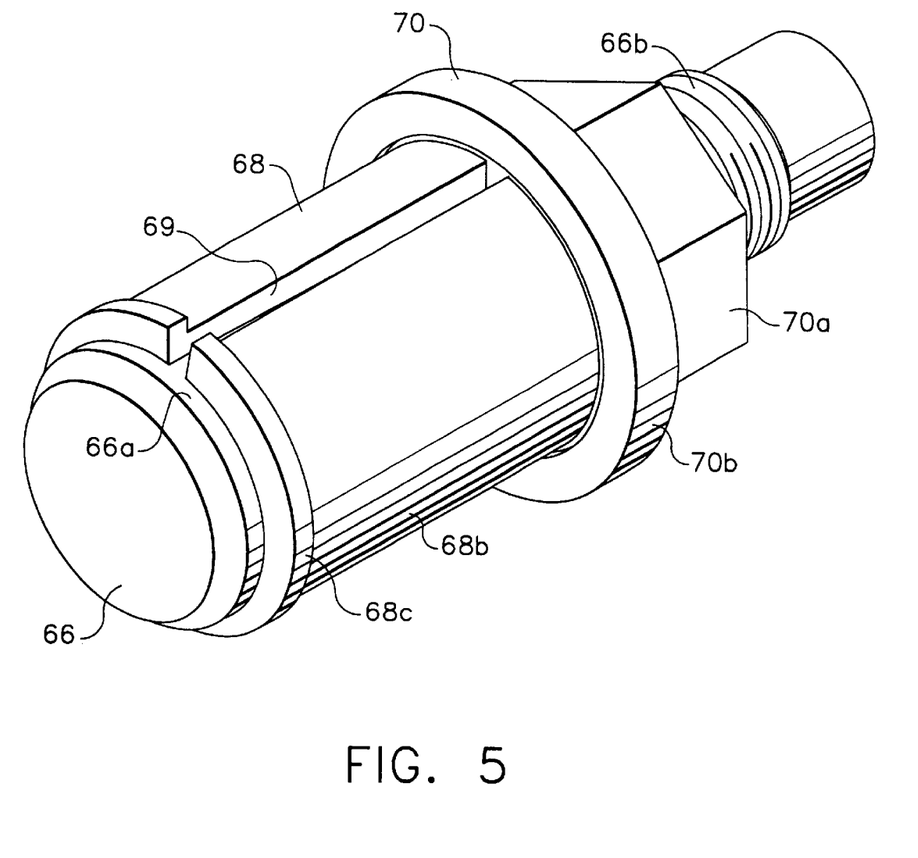
FIG. 5 is a schematic showing an isometric view of a tapered pin assembly having a split sleeve in accordance with the first preferred embodiment of the invention.

The tapered pin assemblies in accordance with the invention can be entirely inserted from one side of the shroud. Prior to insertion, the unflexed sleeve 68 is slid onto the tapered pin 66 and then the nut 70 is threaded onto the pin for a number of turns sufficient to hold the unflexed sleeve 68 in place. At this stage, the diameter of annular flange 68c is less than the diameter of the holes 72, 74 in the bracket and shroud wall, allowing the sleeve 68 to pass through the holes. The assembly is then pushed through the aligned holes in the bracket and shroud wall until the nut 70 abuts the bracket 62c. Once the raised flange 68c of the sleeve 68 overlaps the inner edge of hole 74 in the shroud wall 18d, nut 70 is tightened to pull tapered pin 66 back until the assembly is seated, i.e., the annular flange 68c on the sleeve latches behind the shroud wall. During this operation, the sleeve is held in place initially by a thrust plate on the tool (not shown), reacting between the nut and the sleeve, and then after some expansion, by the raised flange bearing against the inner circumferential surface of the shroud wall. Higher axial load is then applied by torquing or tensioning. This applies a contact pressure between the pins, sleeve, bracket and shroud.

The nut 70 has internal threads which engage the external threads on the threaded portion 66b of pin 66. During installation of the tapered pin assembly 64, a tool is inserted into socket 66c of pin 66 to prevent pin rotation. Alternatively, the socket on the end of the tapered pin can be replaced by a slot. A tool with a hexagonal socket is coupled to the hexagonal head 70a of nut 70 and used to remotely tighten nut 70. Nut 70 further comprises a flange 70b which has a circumferential flange of radius greater than the radius of hole 72. Thus, when nut 70 is tightened, the flange 70b bears against the bracket 62c on the perimeter of hole 72, not against the end of the sleeve.

The outwardly flexed sleeve 68 has an outer circular cylindrical surface 68b of radius equal to the radius of circular holes 72 and 74. The tapered portion 66a of pin 66 applies increasing pressure on sleeve 68 during pin tensioning. When pin 66 is tensioned to the desired amount, nut 70 is tack-welded to the threaded portion 66b of pin 66 to lock the assembly in place. The tensioned and tack-welded pin assembly exerts a radially outwardly directed contact pressure on the cylindrical surfaces of the aligned circular holes 72, 74 respectively formed in the bracket and shroud, to hold the assembly securely in place.

A stud tensioning device can be used to apply large contact pressures, which result in a large friction force that will react loads axial to the shank assembly. Alternatively, where blind installation is not required, the sleeve flange and the head of the tapered pin could be large so that the required preload is small.

A splice bracket suitable for bridging a girth seam weld at an elevation where no change in diameter occurs, such as the shroud portion shown in FIG. 4, could be a piece of plate which is curved to conform to the shroud. If the repair is needed at an elevation where a change in shroud diameter occurs, e.g., at the top guide support ring 18c or at the core plate support ring 18f, the bracket could be a casting, forging or welded plate assembly (such as assembly 62b in FIG. 2). The thickness of the plate is selected based on the available space and the structural requirements. The preferred thickness is in the range of 1 to 3 inches.

The number and location of the tapered pins is selected based on the maximum structural loads that must be carried by the girth seam weld splice brackets. The preferred configuration is four pins per bracket. However, six, eight, twelve or more pins could be used. The size of the bracket in the circumferential direction is determined based on the space available. The preferred width is approximately 3 to 5 feet. The height of the brackets is approximately 1 to 5 feet. Each pin assembly has an outside diameter of between 2 and 5 inches.

Figure 6:
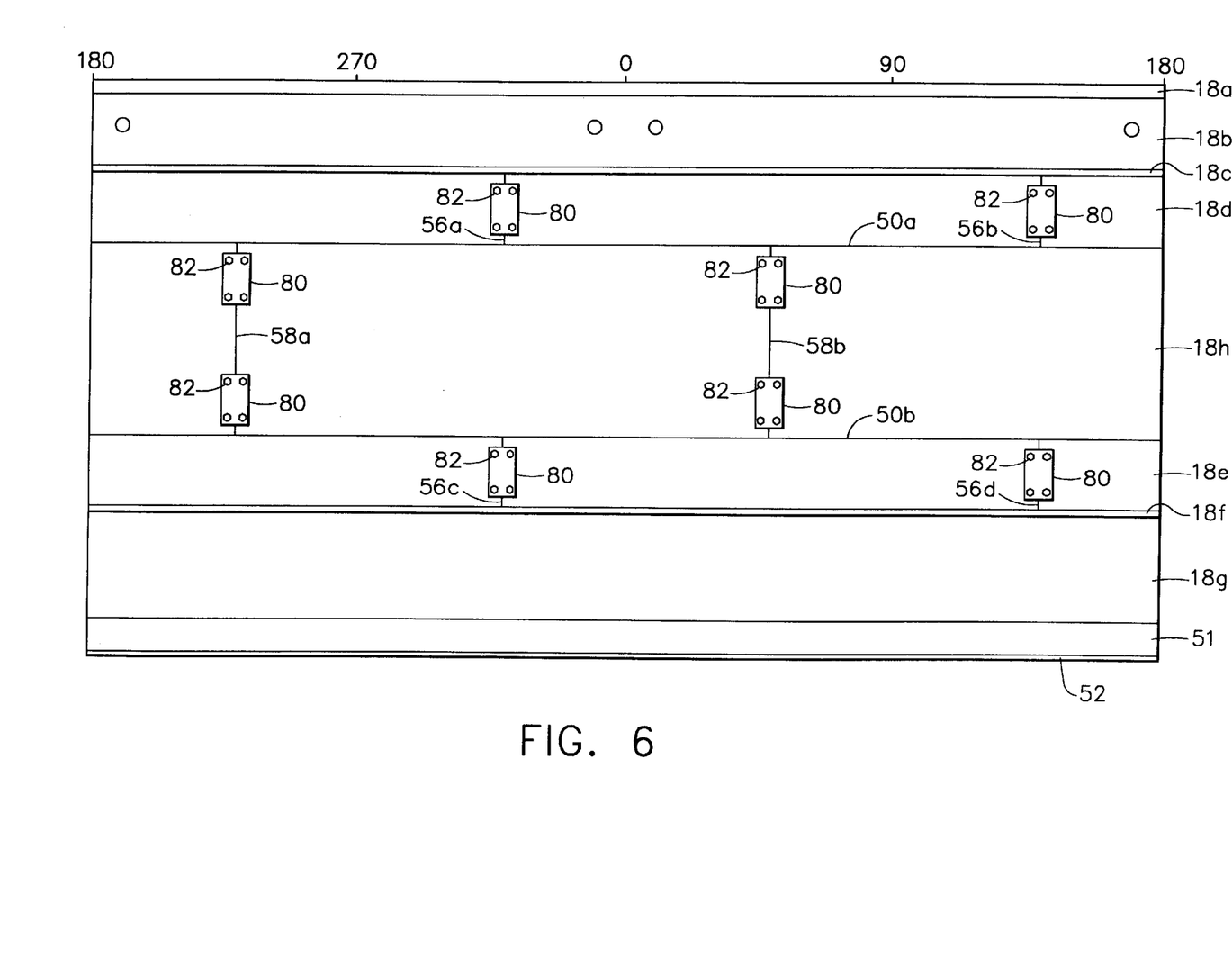
FIG. 6 is a schematic showing a full azimuthal view of another type of BWR core shroud repair having vertical seam weld splice bracket assemblies in accordance with a second preferred embodiment of the invention.

Referring to FIG. 6, another type of core shroud has the same structure as the shroud shown in FIG. 2, except that the top and bottom mid-core shell sections 18d and 18e are respectively welded to a middle mid-core shell section 18h. The top mid-core shell section 18d is joined to the middle mid-core shell section 18h at an upper mid-plane girth weld 50a; the bottom mid-core shell section 18e is joined to the middle mid-core shell section 18h at a lower mid-plane girth weld 50b. Each mid-core shell section (18d, 18e and 18h) consists of two 180° half-shell sections which are joined at a pair of vertical seam welds—welds 56a, 56b for top mid-core shell section 18d; welds 58a, 58b for middle mid-core shell section 18h; and welds 56c, 56d for bottom mid-core shell section 18e. The vertical seam welds 58a, 58b are azimuthally staggered relative to the vertical seam welds 56a–56d. This arrangement of vertical seam welds is exemplary. Shrouds in other BWRs have different shroud section configurations, e.g., a shell comprising three 120° shell sections welded together.

In accordance with a second preferred embodiment of the invention, a respective shroud splice bracket assembly is arranged to bridge each respective cracked vertical seam weld. As seen in FIG. 6, in accordance with one arrangement, each vertical seam weld 56a–56d is bridged by one splice brackets 80 and each vertical seam weld 58a and 58b is bridged by a pair of splice brackets. The purpose of these bracket assemblies is to structurally replace the shroud vertical seam welds which are potentially weakened by cracks. Brackets may be installed only at welds found to have cracking. Each splice bracket 80 is fastened to the shroud to the left and to the right of the vertical seam weld in a manner which will prevent relative movement across the shroud vertical seam welds.

Preferably, each splice bracket 80 is a curved plate having a radius of curvature approximately equal to the corresponding radius of the shroud shell section. The splice bracket 80 is fastened to a shroud shell section by four tapered shank assemblies 82—two on each side of the vertical seam weld.

Figure 7:
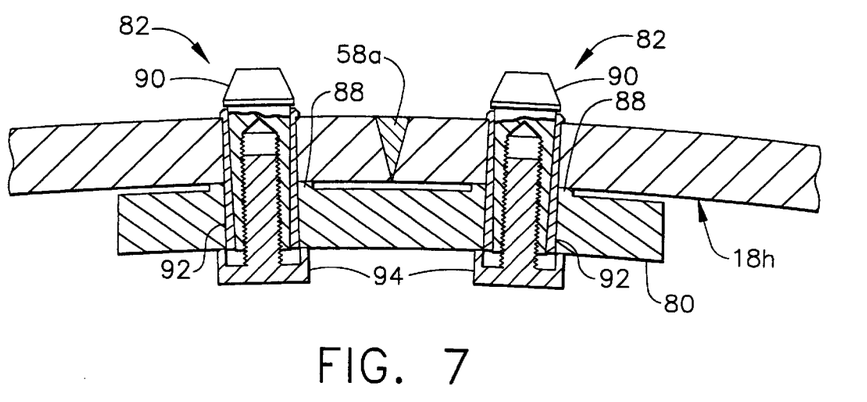
FIG. 7 is a schematic showing a sectional view of an installed vertical seam weld splice bracket assembly in accordance with the second preferred embodiment of the invention.

In accordance with the second preferred embodiment of the invention, each vertical seam weld splice bracket 80 is fastened to the shroud using tapered shank assemblies 82 which couple with aligned holes in the bracket and shroud. FIG. 7 shows a vertical seam weld splice bracket fastened on the interior of the shroud wall. However, the vertical seam weld splice brackets can also be fastened to the exterior of the shroud wall, in which case the direction of the tapered shank assemblies is reversed.

Figure 8:
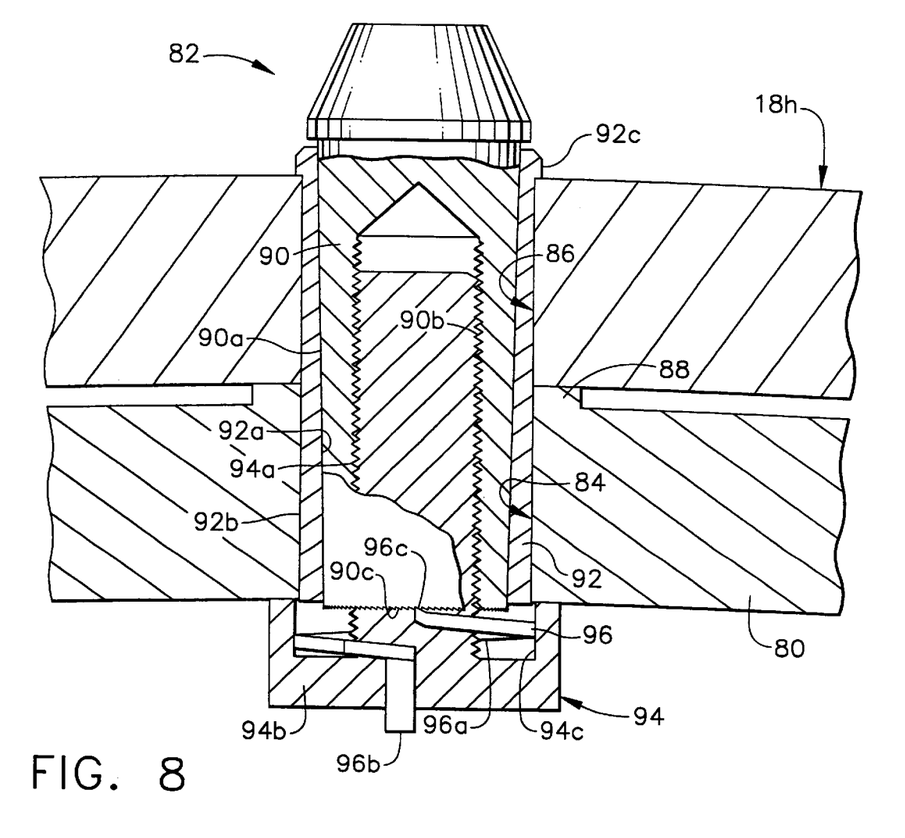
FIG. 8 is a schematic showing a detailed sectional view of an installed vertical seam weld splice bracket assembly in accordance with the second preferred embodiment of the invention.

Referring to FIG. 8, the fully installed tapered shank assembly 82 fits tightly in a hole 84 in the bracket 80 and a hole 86 in the shroud wall. Holes 84 and 86 are both circular cylindrical and of equal diameter. Holes 86 are remotely machined in the shroud wall by a conventional electric discharge or other suitable machining technique. The bracket 80 has raised bearing pads 88 (see FIGS. 7 and 8) which extend around the periphery of holes 84 in the splice bracket. These pads allow local machining to precisely match the contact surface of the bracket to the curved internal surface of the shroud wall.

The assembly 82 for fastening a splice bracket 80 across a vertical seam weld in the middle mid-core shell section 18h comprises a tapered shank 90, a split sleeve 92 and a threaded shear bolt 94. The tapered shank 90 has a conical external surface 92a and a central blind threaded hole 92b which is coaxial with tapered surface 92a. The tapered shank 90 is held inside the holes 84, 86 by split sleeve 92 and threaded shear bolt 94. When fully installed, the tapered portion 90a of shank 90 is encased by split sleeve 92. The split sleeve has a longitudinal slot (not shown in FIG. 8) which allows the sleeve to be flexed radially outward into a configuration having an expanded diameter. The flexed sleeve 92 has an internal conical surface 92a which matches the external conical surface 90a of shank 90; an external surface 92b having a radius of curvature which matches the radius of curvature of hole 84 in the bracket 80 and hole 86 in the middle mid-core shell section 18h; and a raised flange 92c to act as an axial position stop.

The tapered shank assemblies in accordance with the invention can be entirely inserted from one side of the shroud. Prior to insertion, the unflexed sleeve 92 is slid onto the tapered shank 90 and then the threaded shank 94a of shear bolt 94 is threaded into the central blind threaded hole 90b of tapered shank 90 for a number of turns sufficient to hold the unflexed sleeve 92 loosely on the shank. At this stage, the diameter of annular flange 92c is less than the diameter of the holes 84, 86 in the bracket and shroud wall, allowing the sleeve 92 to pass through the holes. The assembly is then pushed through the aligned holes in the bracket and shroud wall until the bolt abuts the bracket 80. Once the raised flange 92c of the sleeve 92 overlaps the inner edge of hole 86 in the shroud wall 18h, bolt 94 is tightened to pull tapered shank 90 back until the assembly is seated, i.e., the annular flange 92c on the sleeve latches behind the shroud wall. The flange 92c is designed to prevent the assembly from pulling apart axially. However, the major loads are the shear loads transmitted from the shroud to the splice plate. When higher axial load is applied by torquing or tensioning the bolt, the fastener assembly is fit tightly into the holes to form a rigid shear fastener joint. This can apply a contact pressure between the shank, sleeve, bracket and shroud.

The central blind hole 90b has internal threads which engage the external threads on the threaded shank 94a of shear bolt 94. During torquing of the shear bolt, the friction between the tapered external surface 90a of shank 90 and the tapered internal surface 92a of sleeve 92 prevents shank rotation. A tool with a hexagonal socket is coupled to the hexagonal head 94b of bolt 94 and used to remotely tighten the bolt. The shear bolt 94 further comprises a flange 94c which extends axially from the bolt head. Bolt flange 94c has an inner radius greater than the radius of hole 84. Thus, when shear bolt 94 is tightened, the bolt flange 94c bears against the bracket 80 on the perimeter of hole 84, not against the end of the sleeve.

The outwardly flexed sleeve 92 has an outer circular cylindrical surface 92b of radius equal to the radius of circular holes 84 and 86. The tapered portion 90a of shank 90 can apply increasing pressure on sleeve 92 during bolt torquing or tensioning. When the shear bolt 94 is tightened the desired amount, the shear bolt is locked against loosening relative to the tapered shank 90 by a ratchet lock washer 96.

Figure 10:
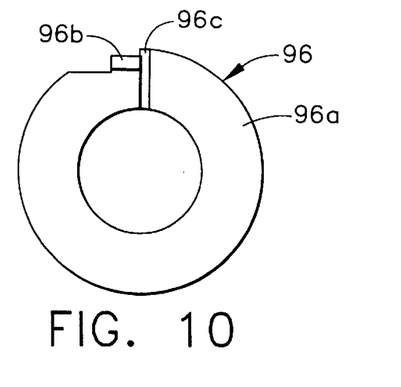
FIG. 10 is a schematic showing a plan view of a lock washer which can be incorporated in the splice bracket assembly of FIG. 8.

Referring to FIGS. 8 and 10, the ratchet lock washer 96 comprises a spring 96a, a locking tang 96b integrally joined to one end of spring 96a and a locking tooth 96c integrally joined to the other end of spring 96a. The lock washer is fabricated with the locking tang disposed horizontally. Thereafter, the tang is bent 90°, to the position shown in FIG. 8.

Figure 9:
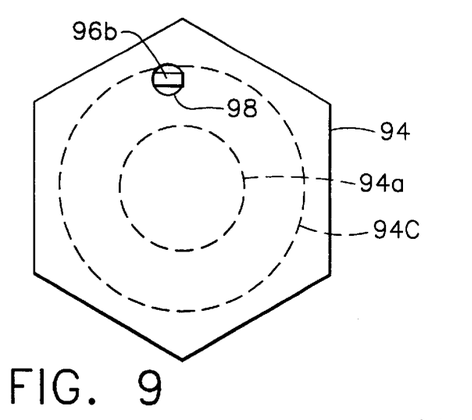
FIG. 9 is a schematic showing a plan view of the head of the shear bolt incorporated in the splice bracket assembly of FIG. 8.

In the locking position, the tang 96b extends into and through a hole 98 (see FIG. 9) formed in the bolt head 94b and the locking tooth 96c meshes with the ratchet teeth 90c formed on the endface of the tapered shank 90. The hole 98 communicates with an annular recess between the bolt shank 94a and the bolt flange 94c. The ratchet teeth are configured to allow the locking tooth 96c to slide over the ratchet teeth as the shear bolt rotates in the direction of tightening, while providing a positive lock against bolt rotation in the detorquing or loosening direction.

The lock washer spring 96a consists of one turn of a flat coil. During tightening of the shear bolt, the spring is compressed so that the locking tooth engages the ratchet teeth with a preload. Because the locking assembly resides in the annular recess between the bolt shank 94a and the bolt flange 94c, the bearing area for the structural load path of the shear bolt, i.e., the area of contact between the bolt flange 94c and the splice bracket 80, is separate from the bearing area of the lock washer. As a consequence, the main bolt load path does not go through the lock washer. The lock washer is free to flex independent of the bolt, allowing it to follow or cam against the ratchet teeth contour during rotation without resulting in variation of the bolt-applied preload. In addition, the spring accommodates a certain amount of tolerance in the relative axial positions of the shear bolt and shank assembly.

The outer radius of lock washer spring 96a is slightly less than the inner radius of bolt flange 94c. This snug fit causes the spring to bear against the bolt flange 94c if the coil is flexed radial outward, for instance, as a result of the shear bolt 94 being urged to rotate in the direction of bolt loosening. The interference of the bolt flange blocks further radially outward expansion of the spring and, as a consequence, blocks bolt rotation in the direction of bolt loosening.

The distal end of the locking tang 96b protruding out of the shear bolt head 94b serves as an indicator that the shear bolt is locked against rotation in the direction of bolt loosening. To test the locking status, the tang distal end is pushed in. If the tang resists inward deflection with resilience, this indicates that the spring is supported between the bolt head and the ratchet lock washer. If the tang does not resist inward deflection, then the spring is loose inside the annular recess and the locking tooth is not meshed with the ratchet teeth, indicating that the shear bolt is not locked or the lock washer needs to be replaced.

Figure 11:
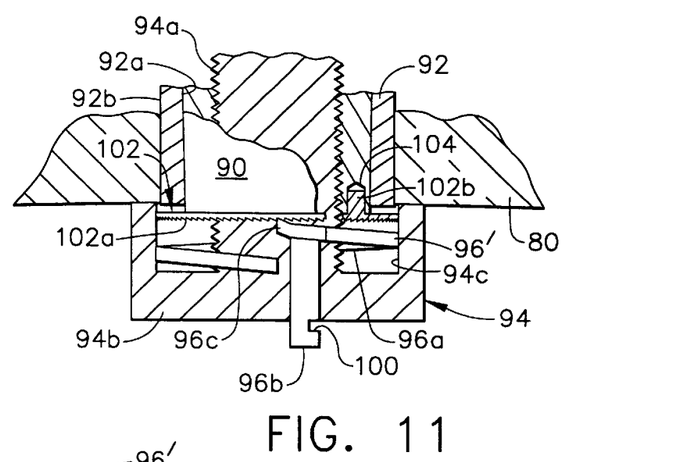
FIG. 11 is a schematic showing a detailed sectional view of an assembly for blocking rotation of the shear bolt in the direction of bolt loosening.
Figure 11A:
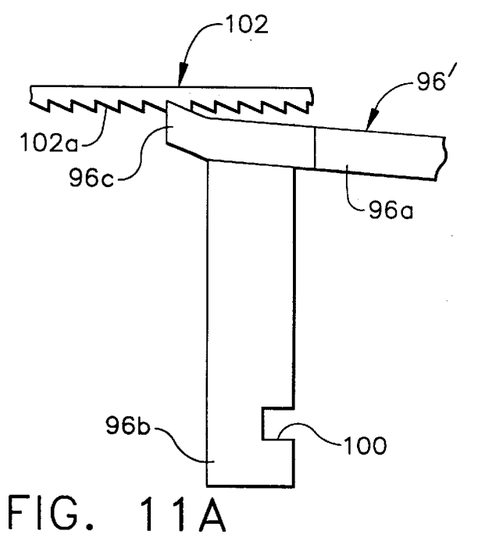
FIG. 11A is a schematic showing the detail of the locking mechanism depicted in FIG. 11.

In accordance with an alternative lock washer construction 96' shown in FIG. 11, the locking tang 96b and locking tooth 96c are connected to the same end of the spring 96a. The locking tang 96b is provided with a recess 100 formed in a distal portion of the tang which protrudes beyond the plane of the bolt head 94b when hole 98 therein is penetrated by the locking tang. The recess 100 enables the distal end of the tang 96b to be grasped by a suitable tool. When the tang is pulled axially away from the ratchet teeth 90c, the locking tooth 96c can be disengaged from the ratchet teeth, freeing the shear bolt 94 for rotation relative to the shank in the direction of bolt loosening. The connection of the locking tang to the end of the spring which carries the locking tooth allows the bolt to be loosened without damaging the ratchet lock washer. In this alternative embodiment, however, the locked condition is indicated by resilient resistance when the locking tang is pulled axially outward.

Figure 12:
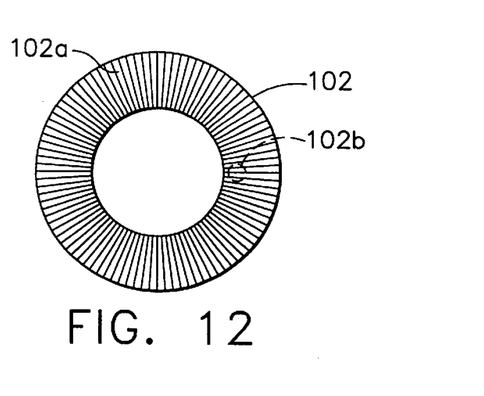
FIG. 12 is a schematic showing a plan view of the ratchet tooth washer incorporated in the locking assembly of FIG. 11.

A further feature of the locking arrangement shown in FIG. 11 is that the ratchet teeth, instead of being machined into the endface of the tapered shank 90, are formed on a separate ratchet tooth washer 102. As seen in FIG. 12, the ratchet tooth washer 102 is a flat annular ring having a multiplicity of radially oriented teeth 102a circumferentially distributed on one side thereof. The ring surrounds the entrance to hole 84 in the splice bracket. A locking pin 102*b* extends axially from the opposite side of the washer and is configured to fit snugly inside a blind hole 104 formed in the tapered shank 90. The ratchet tooth washer 102 is installed in the annular recess between the bolt shank 94*a* and the bolt flange 94*c* with minimal play to ensure against translation of the ratchet tooth washer 102 in a plane perpendicular to the axis of the bolt shank. The engagement of pin 102*b* in blind hole 104 prevents rotation of the ratchet tooth washer 102 about the shank axis.

If the fastener assemblies are tensioned to exert a radially outward contact pressure, the resulting tensile stresses in the shroud could be of concern in highly irradiated steel. This concern can be mitigated by applying a noble metal (e.g., platinum or palladium) coating to the fastener assembly or by alloying appropriate noble metals with the fastener assembly materials. The noble metal will catalyze the recombination of water, thereby reducing the susceptibility of the shroud material to stress corrosion cracking. As used herein, the term "noble metal" includes platinum group metals and mixtures thereof.

In accordance with an alternative embodiment, the split sleeve can be replaced by a plurality of tapered sleeve segments. The angle of the tapered sleeve segments is dependent on their number. For example, if there are two sleeve segments, then each one covers slightly less than 180°. If there are three sleeve segments, then each one covers slightly less than 120°. The number of sleeve segments may be two or more, so long as the sum of the angles is less than 360° by an amount which allows the sleeve segments to pass through the holes in the bracket and shroud wall. Each sleeve segment has a precise internal taper which matches the external conical taper of the pin; an external surface having a radius of curvature which matches the radius of curvature of the holes in the shroud and in the splice bracket; and a raised flange to act as an axial position stop. The use of a plurality of sleeve segments, unlike the split sleeve, requires employment of a special tool to hold the sleeve segments in place during installation of the tapered pin assemblies.

The preferred embodiments of the invention have been disclosed for the purpose of illustration. Variations and modifications of the disclosed structures which do not depart from the concept of this invention will be readily apparent to mechanical engineers skilled in the art of tooling. For example, it will be apparent that the lock washer and ratchet tooth washer could be installed in the annular recess between the nut 70 and the sleeve 68 of the tapered pin assembly shown in FIG. 4, with the lock washer coupled to the nut and the ratchet tooth washer coupled to the sleeve. In addition, the tapered pin assembly of FIG. 4, although disclosed in connection with repair of shroud girth seam welds, can also be used to repair shroud vertical seam welds. Conversely, the tapered shank assembly of FIG. 8, although disclosed in connection with repair of shroud vertical seam welds, can also be used to repair shroud girth seam welds. All such variations and modifications are intended to be encompassed by the claims set forth hereinafter. As used in the claims, the term "conical surface" includes a surface which is a truncated cone and a surface which is a section of a truncated cone.

We claim:

1. A repaired core shroud of a nuclear reactor, comprising:
   a circular cylindrical section of said core shroud having a crack therein;
   a first portion of said circular cylindrical section of said core shroud located on one side of said crack and having a first hole therethrough;
   a second portion of said circular cylindrical section of said core shroud located on another side of said crack and having a second hole therethrough;
   a member bridging said crack and having a first hole which is aligned with said first hole in said core shroud and a second hole which is aligned with said second hole in said core shroud;
   a first fastener installed in said aligned first holes; and
   a second fastener installed in said aligned second holes, wherein said member is fastened to said shroud at least in part by said first and second fasteners.

2. The repaired shroud as defined in claim 1, wherein said crack is located in a vertical weld seam.

3. The repaired shroud as defined in claim 1, wherein said crack is located in a circumferential weld seam.

4. The repaired shroud as defined in claim 1, wherein said first fastener comprises a first pin having a threaded portion with a longitudinal axis and an unthreaded portion with a surface of revolution about said longitudinal axis.

5. The repaired shroud as defined in claim 4, wherein said surface of revolution is conical.

6. The repaired shroud as defined in claim 4, wherein said first fastener further comprises first sleeve means having internal surface means which match said surface of revolution of said first pin and external surface means which match at least one of said first holes when said first sleeve means is in a first state, said internal surface means being in contact with said unthreaded portion of said first pin and said external surface means being in contact with said at least one of said first holes, and having flange means which can fit in said first holes when said first sleeve means is in a second state but not when said first sleeve means is in said first state.

7. The repaired shroud as defined in claim 6, wherein said first fastener further comprises a threaded nut threadably engaging said threaded portion of said first pin for blocking displacement of said first pin in one direction along said longitudinal axis, and said flange means blocks displacement of said first pin in a direction opposite to said one direction when said first sleeve means is in said first state.

8. The repaired shroud as defined in claim 6, wherein said first sleeve means comprises a sleeve having a longitudinal slot, said slotted sleeve being flexed in said first state and unflexed in said second state.

9. The repaired shroud as defined in claim 8, wherein said longitudinal slot extends the full length of said sleeve.

10. The repaired shroud as defined in claim 6, wherein said first sleeve means comprises a plurality of sleeve segments, each of said sleeve segments subtending an equal angle, the sum of said angles being less than 360°.

11. The repaired shroud as defined in claim 1, wherein at least a portion of said first fastener is doped or coated with a noble metal.

12. The repaired shroud as defined in claim 1, wherein said member is a curved plate having a radius of curvature.

13. The repaired shroud as defined in claim 1, wherein said first fastener comprises:
   a first fastener element having a threaded surface and a conical surface which is coaxial with said threaded surface;
   sleeve means comprising a longitudinal slot, an external surface which matches said first holes, an internal surface which matches said conical surface of said first fastener element and a flange which extends radially outward beyond said external surface; and
   a second fastener element having a threaded surface threadably engaged with said threaded surface of said first fastener element.

14. The repaired shroud as defined in claim 13, wherein said first fastener element comprises a tapered shank having a conical surface and a threaded surface, and said second fastener element comprises a threaded bolt threadably engaged with said threaded surface of said tapered shank.

15. A method for repairing a circular cylindrical section of a reactor core shroud having a crack therein, comprising the steps of:

placing a reinforcing member in a position adjacent said circular cylindrical section of said core shroud and bridging said crack; and forming first and second holes in said reinforcing member and first and second holes in said circular cylindrical section of said core shroud, said first hole in said circular cylindrical section of said core shroud being on one side of said crack and said second hole in said circular cylindrical section of said core shroud being on another side of said crack, said first and second holes in said circular cylindrical section of said core shroud being separated by a predetermined distance and said first and second holes of said reinforcing member being separated by said predetermined distance, the result of said placing and forming steps being that said first hole of said reinforcing member is aligned with said first hole in said circular cylindrical section of said core shroud and said second hole of said reinforcing member is aligned with said second hole in said circular cylindrical section of said core shroud, further comprising the steps of:

inserting a first fastener into said aligned first holes of said reinforcing member and said circular cylindrical section of said core shroud;

securing said first fastener in place in said first holes of said reinforcing member and said circular cylindrical section of said core shroud;

inserting a second fastener into said aligned second holes of said reinforcing member and said circular cylindrical section of said core shroud; and securing said second fastener in place in said second holes of said reinforcing member and said circular cylindrical section of said core shroud.

16. The method as defined in claim 15, wherein said inserting and securing steps are performed by remote manipulation on only one side of said shroud.

17. The method as defined in claim 15, wherein said secured first fastener exerts a radially outwardly directed contact load on the surface of said first hole in said shroud.

18. The method as defined in claim 15, wherein a first portion of said secured first fastener extends outside said first holes and inside said shroud and a second portion of said secured first fastener extends outside said first holes and outside said shroud.

* * * * *